US012699280B2

(12) United States Patent
Szwaczka

(10) Patent No.: US 12,699,280 B2
(45) Date of Patent: Aug. 4, 2026

(54) COUPLING UNIT FOR EYEGLASS FRAMES, AND AN EYEGLASS FRAME COMPRISING THE UNIT

(71) Applicant: OVVO Optics Spółka z Ograniczon Odpowiedzialnością, Bielawa (PL)

(72) Inventor: Wacław Szwaczka, Bielawa (PL)

(73) Assignee: OVVO OPTICS SPOLKA Z OGRANICZONA ODPOWIEDZIALNOSCIA, Bielawa (PL)

( * ) Notice: Subject to any disclaimer, the term of this patent is extended or adjusted under 35 U.S.C. 154(b) by 245 days.

(21) Appl. No.: 18/645,384

(22) Filed: Apr. 25, 2024

(65) Prior Publication Data

US 2025/0004299 A1      Jan. 2, 2025

(30) Foreign Application Priority Data

Jun. 27, 2023    (PL) ......................................... 445361

(51) Int. Cl.
G02C 5/22            (2006.01)

(52) U.S. Cl.
CPC .................................. G02C 5/2254 (2013.01)

(58) Field of Classification Search
CPC .......... G02C 5/14; G02C 5/22; G02C 5/2209; G02C 5/2254; G02C 2200/22
USPC .................................... 351/140, 153; 16/228
See application file for complete search history.

(56) References Cited

U.S. PATENT DOCUMENTS

| | | | |
|---|---|---|---|
| 7,543,931 B2 * | 6/2009 | Proksch ................... | G02C 1/08 351/113 |
| 9,069,190 B2 * | 6/2015 | Carpenter ............ | G02C 5/2254 |
| 2005/0094093 A1 * | 5/2005 | Ku ........................... | G02C 5/22 351/116 |
| 2007/0121062 A1 * | 5/2007 | Habermann ......... | G02C 5/2254 351/153 |
| 2015/0029457 A1 * | 1/2015 | Bystritsky ................ | G02C 5/16 351/178 |

(Continued)

FOREIGN PATENT DOCUMENTS

| | | |
|---|---|---|
| EP | 1023626 B1 | 8/2000 |
| EP | 2963481 A1 | 1/2016 |

(Continued)

*Primary Examiner* — Darryl J Collins
(74) *Attorney, Agent, or Firm* — Andrzej Malarz, Esq.

(57)                ABSTRACT

A coupling unit for eyeglass frames for coupling the eyeglass frame front (1) to the temple (3), where the coupling unit comprises a subunit of the eyeglass frame front (1) and a subunit of the temple (3), and where the subunit of the eyeglass frame front (1) comprises two pins (2), and the subunit of the temple (3) comprises two sockets (4) in which the said pins (2) are fitted pivotally, and where placed between the said sockets (4) is a resilient element (5) of the subunit of the temple (3) which protrudes beyond the said sockets (4), and placed between the said pins (2) of the subunit of the eyeglass frame front (1) is a guiding element (6) for the said resilient element (5) is characterized in that the subunit of the eyeglass frame front (1) features an opening (7) to accommodate the resilient element (5) of the subunit of the temple (3) whenever the temple (3) is pivoted away by any angle larger than 90° with respect to the subunit of the eyeglass frame front (1).

9 Claims, 3 Drawing Sheets

(56) References Cited

U.S. PATENT DOCUMENTS

2019/0353923 A1 * 11/2019 Ricart Gisbert ......... G02C 1/08
2022/0179235 A1    6/2022 Lanaro

FOREIGN PATENT DOCUMENTS

PL          210490 B1    6/2006
WO     2005109081 A2   11/2005

* cited by examiner

1

COUPLING UNIT FOR EYEGLASS FRAMES, AND AN EYEGLASS FRAME COMPRISING THE UNIT

The invention concerns a coupling unit for eyeglass frames for coupling the eyeglass frame front to the temple in an easy and quick manner, and an eyeglass frame. In particular, the invention concerns an improved coupling for eyeglass frames made of metal.

Known in the prior art is generally rotatable connection of the temples to the frame front using various types of hinges made of plastic and/or metal so as to enable pivotal movement of the temples with respect to the front of the eyeglass frame in which the eyeglass lenses are fitted. Generally known are joints of the screw type or achieved by rotatable direct connection of the coupling elements.

For example, known from patent document WO 2005/109081 A2 is an eyeglass frame comprising the front for securing the lenses in place and the temples connected to the front in an articulated manner with a screwless hinge. One part of the hinge is fitted slidingly in the other part, where the temple has at least one spring tongue which cooperates with the sliding surface of the frame front.

Known from patent document EP 1 023 626 B1 is an eyeglass frame which comprises the front and a pair of temples connected to the front with hinges which ensure appropriate coupling without pins or screws. In this case eyeglass temples have extensions at the ends on the side of the frame, where the extensions are coiled so that they form a tube which fits into the corresponding holes in the frame.

Known from patent document US 2022/0179235 A1 is a hinged eyeglass frame having a front, a pair of temples, and a pair of hinges configured so as to ensure pivotal connection between each temple and the frame front, where each hinge comprises a pin with wedge-shaped ends and devices which block the movement of the temple.

Known from patent document EP 2 963 481 A1 is a hinge for eyeglass frame which connects the frame front and the temple. The hinge comprises the first element, where one of its ends is given the shape of a blade with the carrying edge and where its terminal edge is oriented askew with respect to the carrying edge, and which comprises fasteners. The hinge comprises the second element which features a groove the width of which corresponds to the thickness of the blade. Moreover, the hinge comprises a flexible cap which has a cross bar placed within the fastener and in addition at least one arm anchored in the second element. The cross bar tends to press the first element into the groove, where the first element and the second element can pivot with respect to each other between the open position and the closed position.

Known from patent document PL 210490 B1 is a metal eyeglass frame which comprises profiled rings with fittings in which longitudinal through-openings are made on one end, on the side of the lenses. The fittings have extensions in the form of connectors with plugs fitted in sockets on the sides, where the sockets take the form of sleeve-shaped folds at the ends of flat bars. Fitted between the flat bars are resilient strips with sockets in which the temples get blocked in the closed position. The flat bars and strips plus the temples form two homogenous subunits all elements of which are made of a thin metal sheet in the punching process. The same process is used to make the subunit punched from a thin metal sheet which comprises profiled rings of the fittings and the connectors.

The main purpose of the present invention is to solve the problem of securing an eyeglass frame against damage whenever the temple is excessively pivoted away from the eyeglass frame front. Another purpose of the present invention is to provide an eyeglass frame which is easy to make.

According to the present invention, a coupling unit for eyeglass frames for coupling the eyeglass frame front to the temple, where the coupling unit comprises a subunit of the eyeglass frame front and a subunit of the temple, and where the subunit of the eyeglass frame front comprises two pins, and the subunit of the temple comprises two sockets in which the said pins are fitted pivotally, and where placed between the said sockets is a resilient element of the subunit of the temple which protrudes beyond the said sockets, and placed between the said pins of the subunit of the eyeglass frame front is a guiding element for the said resilient element of the subunit of the temple, is characterized in that the subunit of the eyeglass frame front features an opening to accommodate the resilient element of the subunit of the temple whenever the temple is pivoted away by any angle larger than 90° with respect to the subunit of the eyeglass frame front.

Preferably, the subunit of the eyeglass frame front constitutes an integral part of the eyeglass frame front referred to above.

Preferably, fixed to the guiding element of the subunit of the eyeglass frame front is an additional guiding element in the form of a cap with rounded working ends.

Preferably, the subunit of the temple constitutes an integral part of the said temple.

Preferably, the resilient element of the subunit of the temple features a profiled socket to accommodate the ends of the guiding element of the subunit of the eyeglass frame front or the ends of the additional guiding element fixed to the said guiding element of the subunit of the eyeglass frame front.

The eyeglass frame according to the present invention comprises an eyeglass frame front, two temples, and two coupling units to connect the front of the eyeglass frame to the temples, as described above.

Preferably, the eyeglass frame front and the temples are made of metal.

Preferably, the free ends of the temples feature flexible elements.

The solution according to the invention meets the assumed purpose.

The invention in its embodiments is shown on a drawing, where:

FIG. 1 presents the assembled coupling unit in a perspective view in the position when the temple is folded;

Figure 1:
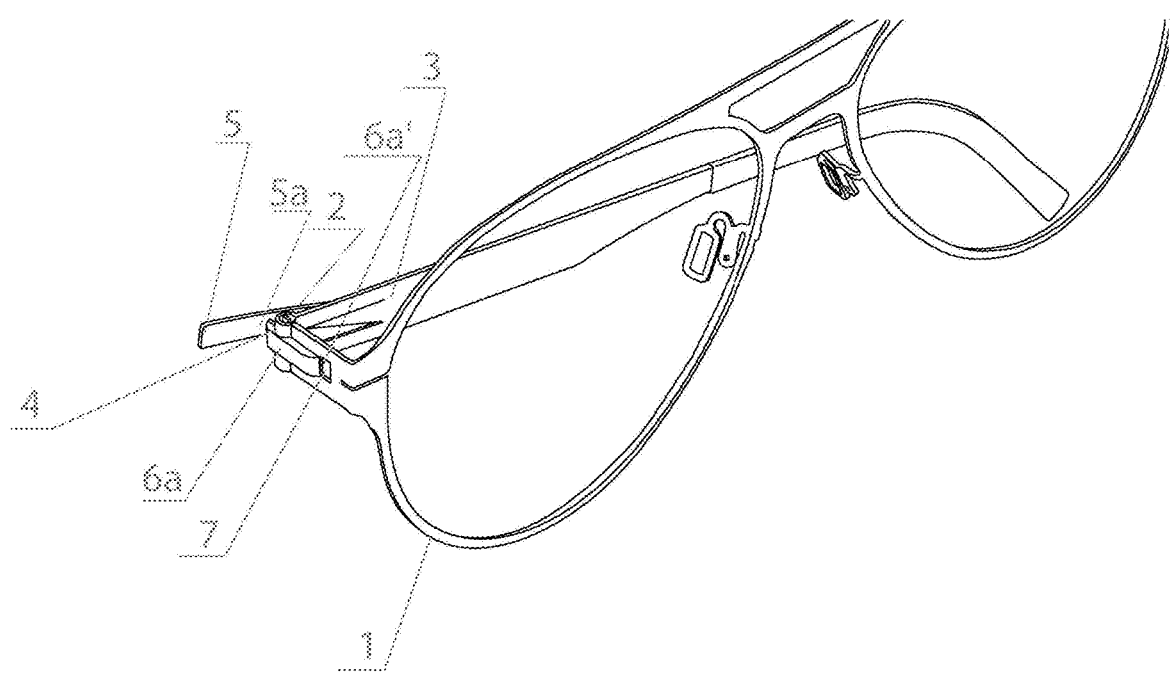
Figure 2:
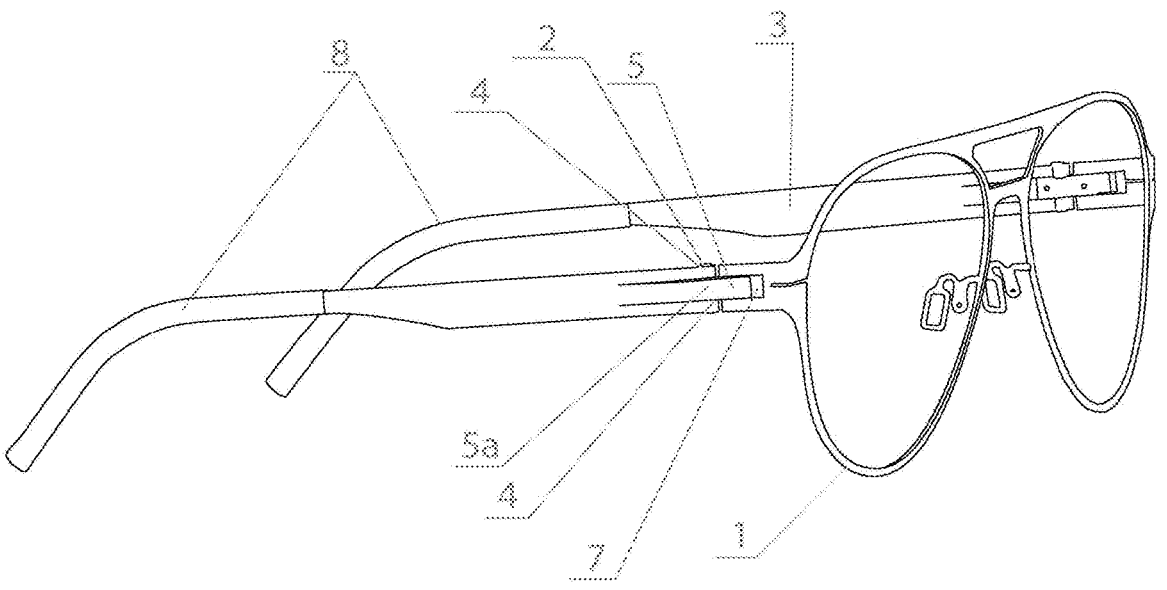
FIG. 2 shows the assembled coupling unit in a perspective view in the position when the temple is unfolded.
Figure 3:
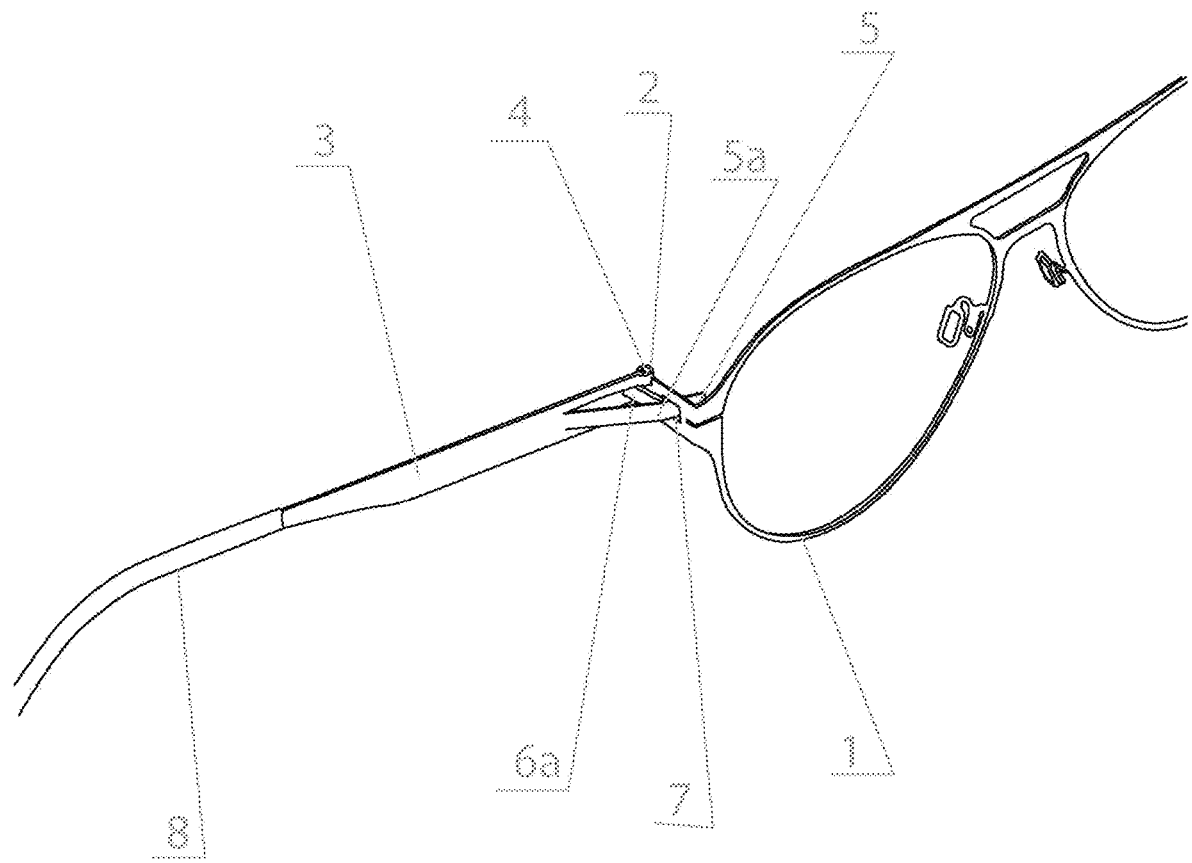
FIG. 3 depicts the assembled coupling unit in a perspective view with excessively unfolded temple.
Figure 4:
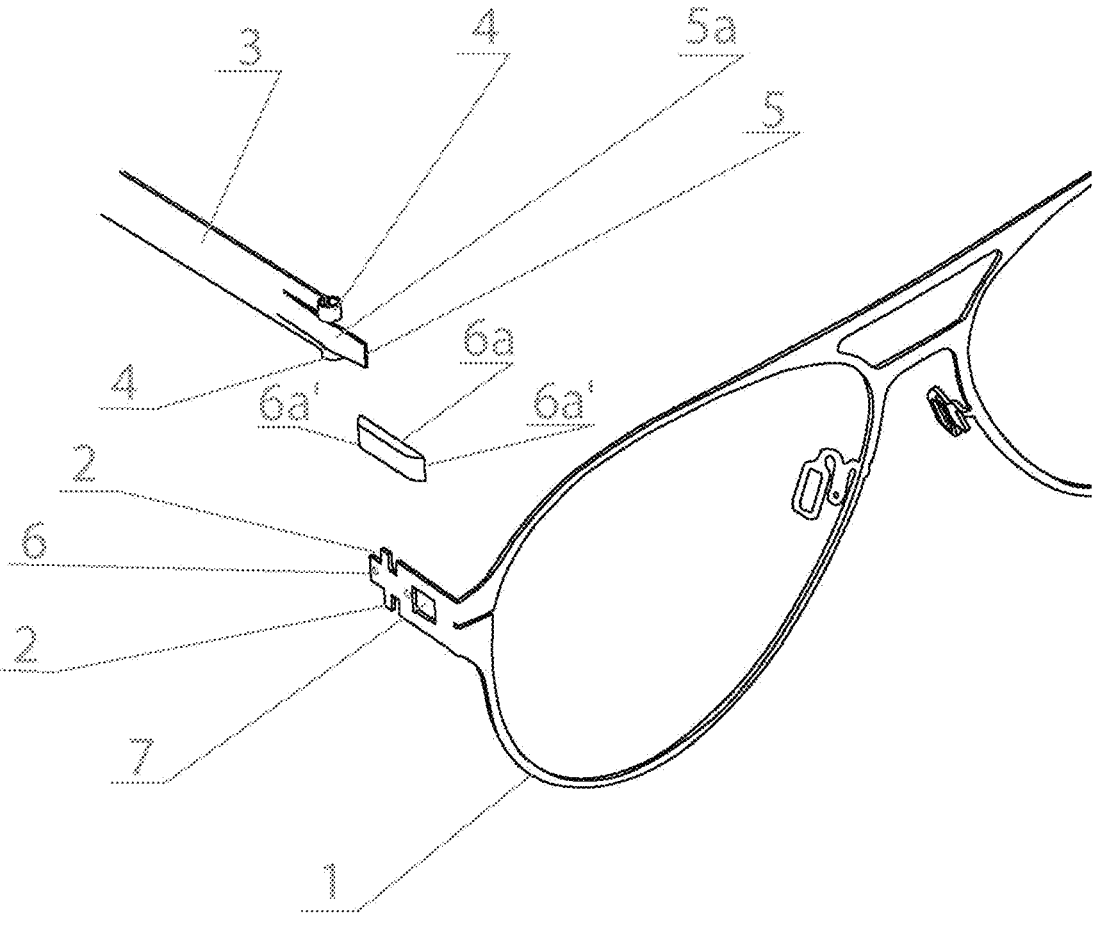
FIG. 4 shows the subunit of the eyeglass frame front and the subunit of the temple prior to assembly, in a perspective view.

In the exemplary embodiment of the invention, a coupling unit for eyeglass frames for coupling the eyeglass frame front 1 to the temple 3 comprises a subunit of the frame front 1 of the eyeglass frame and a subunit of the temple 3, as shown in FIG. 4. The subunit of the frame front 1 of the eyeglass frame comprises two pins 2, and the subunit of the temple 3 comprises two sockets 4 in which the said pins 2 are mounted rotationally (as shown in FIG. 1 to FIG. 3). Placed between the sockets 4 is the resilient element 5 of the subunit of the temple 3, which protrudes beyond the said sockets 4, and placed between the pins 2 of the subunit of the frame front 1 of the eyeglass frame is a guiding element 6 for the said resilient element 5. The guiding element 6 can be fitted with an additional guiding element 6*a* in the form of a cap with rounded working ends 6*a*' (as shown in FIG. 4), where the cap is fixed to the guiding element 6, and where cooperating with the ends 6*a*' is the resilient element 5 of the subunit of the temple 3 when the temple 3 is being unfolded and folded. The subunit of the frame front 1 of the eyeglass frame features an opening 7 to accommodate the resilient element 5 of the subunit of the temple 3 when the temple 3 is being pivoted away at any angle larger than 90° with respect to the eyeglass frame front 1, as shown in FIG. 3. The resilient element 5 of the subunit of the temple 3 can feature a profiled socket 5*a* to accommodate the ends of the guiding element 6 or the ends 6*a*' of the additional guiding element 6*a*, intended to stabilise the position of the resilient element 5 of the temple 3 when folded (as shown in FIG. 1) and unfolded (as shown in FIG. 2) when eyeglasses are being used.

The subunit of the frame front 1 of the eyeglass frame constitutes an integral part of the said eyeglass frame front 1, and the subunit of the temple 3 constitutes an integral part of the said temple 3, while the additional guiding element 6*a* is a separate part, as shown in FIG. 4. The additional guiding element 6*a* may be fixed to the guiding element 6, for example with rivets.

FIG. 2 presents an eyeglass frame in which the eyeglass frame front 1 where the lenses are mounted is connected to the two temples 3 via the coupling unit described above.

The eyeglass frame front 1 with the coupling subunit can be punched of metal as a uniform element, and the temples 3 together with the coupling subunit can also be punched of metal as a uniform element. Moreover, free ends of the temples 3 can be fitted with flexible elements 8.

LIST OF NUMERICAL REFERENCES

1—eyeglass frame front
2—pins of the subunit of the eyeglass frame front
3—temple
4—sockets of the subunit of the temple
5—resilient element of the subunit of the temple
5*a*—socket in the resilient element of the subunit of the temple
6—guiding element of the subunit of the eyeglass frame front
6*a*—additional guiding element of the subunit of the eyeglass frame front
6*a*'—ends of additional guiding element of the subunit of the eyeglass frame front
7—opening in the subunit of the eyeglass frame front
8—flexible element of the temple

The invention claimed is:

1. A coupling unit for eyeglass frames for coupling the eyeglass frame front to the temple, where the coupling unit comprises a subunit of the eyeglass frame front (1) and a subunit of the temple (3), and where the subunit of the eyeglass frame front (1) comprises two pins (2), and the subunit of the temple (3) comprises two sockets (4) in which the said pins (2) are fitted pivotally, and where placed between the said sockets (4) is a resilient element (5) of the subunit of the temple (3) which protrudes beyond the said sockets (4), and placed between the said pins (2) of the subunit of the eyeglass frame from front (1) is a guiding element (6) for the said resilient element (5) of the subunit of the temple (3), wherein the subunit of the eyeglass frame front (1) features an opening (7) to accommodate the resilient element (5) of the subunit of the temple (3) whenever the temple (3) is pivoted away from the folded position with respect to the subunit of the eyeglass frame front (1), wherein, the resilient element (5) of the subunit of the temple (3) passes through the opening (7) from the outside of the subunit of the eyeglass frame front (1) only whenever the temple (3) is pivoted away by any angle larger than 90° from the folded position of the temple (3) with respect to the subunit of the eyeglass frame front (1).

2. The unit according to claim 1, characterized in that the subunit of the eyeglass frame front (1) constitutes an integral part of the eyeglass frame front (1).

3. The unit according to claim 1, characterized in that fixed to the guiding element (6) of the subunit of the eyeglass frame front (1) is an additional guiding element (6*a*) in the form of a cap with rounded working ends (6*a*').

4. The unit according to claim 3, characterized in that the resilient element (5) of the subunit of the temple (3) features a profiled socket (5*a*) to accommodate the ends (6*a*') of the additional guiding element (6*a*) of the subunit of the eyeglass frame front (1).

5. The unit according to claim 1, characterized in that the subunit of the temple (3) constitutes an integral part of the said temple (3).

6. The unit according to claim 1, characterized in that the resilient element (5) of the subunit of the temple (3) features a profiled socket (5*a*) to accommodate the ends of the guiding element (6) of the subunit of the eyeglass frame front (1).

7. An eyeglass frame comprising an eyeglass frame front (1), two temples (3), and two coupling units according to claim 1 to connect the front (1) of the eyeglass frame to the temples (3).

8. The eyeglass frame according to claim 7, characterized in that the eyeglass frame front (1) and the temples (3) are made of metal.

9. The eyeglass frame according to claim 7, characterized in that free ends of the temples (3) feature flexible elements (8).

* * * * *